(12) United States Patent
Ishikawa et al.

(10) Patent No.: US 11,022,749 B2
(45) Date of Patent: *Jun. 1, 2021

(54) OPTICAL FIBER

(71) Applicant: SUMITOMO ELECTRIC INDUSTRIES, LTD., Osaka (JP)

(72) Inventors: Hiroki Ishikawa, Osaka (JP); Keisei Morita, Osaka (JP); Sotaro Ida, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,486

(22) Filed: Feb. 26, 2020

(65) Prior Publication Data

US 2020/0278493 A1 Sep. 3, 2020

(30) Foreign Application Priority Data

Feb. 28, 2019 (JP) .............................. JP2019-035767

(51) Int. Cl.
*G02B 6/02* (2006.01)
(52) U.S. Cl.
CPC ..... *G02B 6/02395* (2013.01); *G02B 6/02004* (2013.01)

(58) Field of Classification Search
None
See application file for complete search history.

(56) References Cited

U.S. PATENT DOCUMENTS

2020/0278492 A1* 9/2020 Morita ................. G02B 6/0365
2020/0400882 A1* 12/2020 Mukasa ............. G02B 6/03633

FOREIGN PATENT DOCUMENTS

JP H05-060954 A 3/1993

* cited by examiner

*Primary Examiner* — Michelle R Connelly
(74) *Attorney, Agent, or Firm* — Faegre Drinker Biddle & Reath LLP

(57) ABSTRACT

An optical fiber includes a glass fiber and a coating resin covering an outer periphery of the glass fiber. The glass fiber includes a core and a cladding. An outer diameter of the glass fiber is 99 μm or larger and 101 μm or smaller. The coating resin includes a cured material of an ultraviolet curing resin composition. An outer diameter of the coating resin is 160 μm or larger and 170 μm or smaller. A mode field diameter for light having a wavelength of 1310 nm is 7.2 μm or larger and 8.2 μm or smaller. Bending loss at a wavelength of 1550 nm when wound in a ring shape having a radius of 10 mm is 0.1 dB/turn or less. Bending loss at the wavelength of 1550 nm when wound in the ring shape having the radius of 7.5 mm is 0.5 dB/turn or less.

11 Claims, 2 Drawing Sheets

OPTICAL FIBER

CROSS REFERENCE

The present application is based upon and claims the benefit of the priority from Japanese patent application No. P2019-035767, filed on Feb. 28, 2019, which is hereby incorporated by reference in its entirety.

TECHNICAL FIELD

The present disclosure relates to an optical fiber.

BACKGROUND

JPH05-60954A discloses an optical fiber core wire having an outer diameter of 230 µm or smaller and provided with an optical fiber made of quartz glass and having an outer diameter of 125 µm and a coating formed of a resin. In the optical fiber core wire, a diameter is reduced by thinning a coating thickness.

SUMMARY

An optical fiber according to one embodiment of the present disclosure includes a glass fiber and a coating resin covering an outer periphery of the glass fiber. The glass fiber includes a core and a cladding covering an outer periphery of the core. A refractive index of the cladding is lower than a refractive index of the core. An outer diameter of the glass fiber is 99 µm or larger and 101 µm or smaller. The coating resin includes a cured material of an ultraviolet curing resin composition. An outer diameter of the coating resin is 160 µm or larger and 170 µm or smaller. A mode field diameter for light having a wavelength of 1310 nm is 7.2 µm or larger and 8.2 µm or smaller. Bending loss at a wavelength of 1550 nm when wound in a ring shape having a radius of 10 mm is 0.1 dB/turn or less. Bending loss at the wavelength of 1550 nm when wound in the ring shape having the radius of 7.5 mm is 0.5 dB/turn or less.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
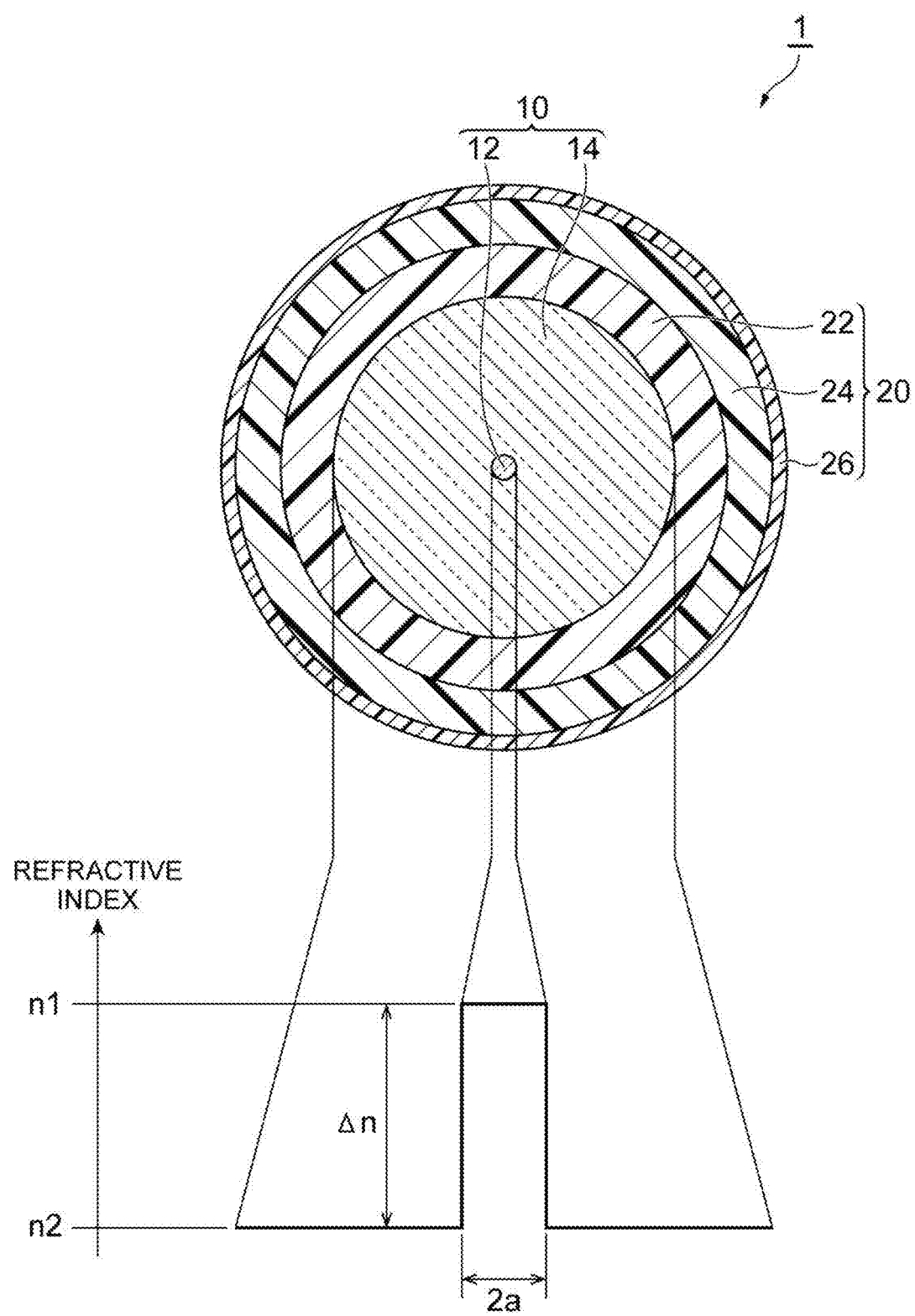
FIG. 1 illustrates a sectional view and a refractive index distribution of an optical fiber according to one embodiment.

Problem to be Solved by the Present Disclosure

In the optical fiber core wire described above, the coating resin thickness is thin. Therefore, when the optical fiber core wire is densely housed in a cable, irregular stress applied to a coating resin as a lateral pressure is easily transmitted to an optical fiber. Thus, the optical fiber is irregularly bent and there is a risk that transmission loss referred to as microbending loss increases.

Then, an object is to provide an optical fiber capable of suppressing the transmission loss while reducing a diameter.

Advantageous Effect of the Present Disclosure

According to the present disclosure, the optical fiber capable of suppressing the transmission loss while reducing the diameter can be provided.

Description of Embodiments of the Present Disclosure

First, embodiments of the present disclosure will be listed and described. The optical fiber according to one embodiment of the present disclosure includes a glass fiber and a coating resin covering an outer periphery of the glass fiber. The glass fiber includes a core and a cladding covering an outer periphery of the core. A refractive index of the cladding is lower than a refractive index of the core. An outer diameter of the glass fiber is 99 µm or larger and 101 µm or smaller. The coating resin includes a cured material of an ultraviolet curing resin composition. An outer diameter of the coating resin is 160 µm or larger and 170 µm or smaller. A mode field diameter for light having a wavelength of 1310 nm is 7.2 µm or larger and 8.2 µm or smaller. Bending loss at a wavelength of 1550 nm when wound in a ring shape having a radius of 10 mm is 0.1 dB/turn or less. Bending loss at the wavelength of 1550 nm when wound in the ring shape having the radius of 7.5 mm is 0.5 dB/turn or less.

In the optical fiber according to the embodiment described above, the outer diameter of the glass fiber is 99 µm or larger and 101 µm or smaller. Therefore, even when the outer diameter of the coating resin is 160 µm or larger and 170 µm or smaller and the diameter is reduced, a thickness of the coating resin is secured. Thus, even in a case where irregular stress is applied to the coating resin as a lateral pressure, irregular bending of the glass fiber is suppressed. In addition, since the mode field diameter is reduced, confinement of light is strengthened. Thus, microbending loss is suppressed. Therefore, transmission loss can be suppressed while reducing the diameter.

In one embodiment, a cable cutoff wavelength may be 1530 nm or shorter. Transmission loss at the wavelength of 1530 nm or longer and 1565 nm or shorter may be 0.3 dB/km or less. A loss increase amount at the wavelength of 1550 nm when an outer periphery of a cylinder having the outer diameter of 280 mm is covered with sandpaper of #240 and the optical fiber is wound around the outer periphery of the cylinder with tension of 0.8 N in such a way as to be in contact with the sandpaper may be 1 dB/km or less. In this case, the light having the wavelength of 1550 nm can be transmitted with low loss.

In one embodiment, a cable cutoff wavelength may be 1260 nm or shorter. Transmission loss at the wavelength of 1310 nm or longer and 1625 nm or shorter may be 0.4 dB/km or less. A loss increase amount at the wavelength of 1550 nm when an outer periphery of a cylinder having the outer diameter of 280 mm is covered with sandpaper of #240 and the optical fiber is wound around the outer periphery of the cylinder with tension of 0.8 N in such a way as to be in contact with the sandpaper may be 1 dB/km or less. In this case, the light having the wavelength of 1550 nm can be transmitted with low loss.

In one embodiment, a MAC value being a ratio of a mode field diameter MFD [µm] for the light having the wavelength of 1310 nm to a cable cutoff wavelength λcc [nm] may be 6.9 or smaller. In this case, the microbending loss can be more surely suppressed.

In one embodiment, a virtual temperature of glass configuring the glass fiber may be 1600° C. or higher and 1700°

C. or lower. In this case, since increase of the virtual temperature is suppressed, the increase of the transmission loss correlated with the virtual temperature is suppressed.

In one embodiment, the core may include a material in which germanium is added to pure silica glass. The cladding may include the pure silica glass. The cladding may have an absorption peak at a wave number of 2500 cm$^{-1}$ or larger and 3000 cm$^{-1}$ or smaller in an IR spectrum. In this case, since the germanium is added to the core, a specific refractive index difference between the core and the cladding can be turned to a predetermined value or larger. In addition, the cladding has the absorption peak due to deuterium processing. That is, since defects increased accompanying diameter reduction of the glass fiber are repaired by the deuterium processing, the transmission loss can be suppressed further.

In one embodiment, tensile strength in a center axis direction may be larger than 0.69 GPa. In this case, disconnection of the optical fiber can be suppressed.

In one embodiment, the coating resin may include a primary coating resin layer covering the outer periphery of the glass fiber and a secondary coating resin layer covering an outer periphery of the primary coating resin layer. In this case, a microbending loss resistant characteristic can be efficiently improved.

In one embodiment, a Young's modulus of the primary coating resin layer may be 0.7 MPa or smaller. An outer diameter of the primary coating resin layer may be 120 μm or larger and 140 μm or smaller. A Young's modulus of the secondary coating resin layer may be 800 MPa or larger and 3000 MPa or smaller. An outer diameter of the secondary coating resin layer may be 150 μm or larger and 170 μm or smaller. In this case, the microbending loss resistant characteristic can be efficiently improved.

In one embodiment, the coating resin may further include a colored resin layer covering an outer periphery of the secondary coating resin layer. An outer diameter of the colored resin layer may be 160 μm or larger and 170 μm or smaller. In this case, identification of the optical fiber is facilitated by the colored resin layer.

In one embodiment, the secondary coating resin layer may include coloring ink, and may configure an outermost layer of the coating resin. In this case, the identification of the optical fiber is facilitated by the secondary coating resin layer.

Detailed Description of the Embodiments of the Present Disclosure

Specific examples of the optical fiber of the present disclosure will be described with reference to drawings hereinafter. In description of the drawings, same signs are attached to same elements and redundant description is omitted. Note that the present invention is not limited to the examples and is indicated by the scope of claims, and it is intended to include meanings equal to the scope of the claims and all changes within the scope.

FIG. 1 is a sectional view of the optical fiber according to one embodiment and a diagram illustrating a refractive index distribution. As illustrated in FIG. 1, an optical fiber 1 of the present embodiment includes a glass fiber 10 and a coating resin 20 covering the outer periphery of the glass fiber 10. The sectional view in FIG. 1 expresses a cross section vertical to a center axis direction (optical axis direction) of the optical fiber 1. The ordinate of the refractive index distribution in FIG. 1 indicates a refractive index.

The glass fiber 10 is a light guiding optical transmission body that transmits light introduced to the optical fiber 1. The glass fiber 10 is a member made of glass, and is configured with silica ($SiO_2$) glass as a base material (main component) for example. A virtual temperature of the glass configuring the glass fiber 10 is 1600° C. or higher and 1700° C. or lower. An outer diameter (diameter) of the glass fiber 10 is 99 μm or larger and 101 μm or smaller, and is smaller than the outer diameter (125 μm) of a general glass fiber. The glass fiber 10 includes a core 12 extending along a predetermined axis, and a cladding 14 covering the outer periphery of the core 12. The core 12 and the cladding 14 are concentrically arranged. The core 12 is provided in an area including a center axis line of the glass fiber 10 for example. An outer diameter $2a$ of the core 12 is, for example, 5 μm or larger and 9 μm or smaller. The cladding 14 is provided in an area surrounding the core 12. The cladding 14 is in contact with the outer periphery of the core 12. An outer diameter of the cladding 14 is equal to the outer diameter of the glass fiber 10, and is 99 m or larger and 101 μm or smaller.

The core 12 and the cladding 14 are configured with the silica glass as the base material (main component) for example. The core 12 includes a material in which germanium (Ge) is added to pure silica glass for example. Here, the pure silica glass does not practically include impurities. The core 12 may include $GeO_2$ and/or elemental fluorine. In contrast, the cladding 14 includes the pure silica glass for example. Thus, a refractive index n2 of the cladding 14 becomes lower than a refractive index n1 of the core 12, and a specific refractive index difference Δn between the core 12 and the cladding 14 can be turned to a predetermined value or larger.

The coating resin 20 includes a primary resin layer 22 (primary coating resin layer) covering the outer periphery of the glass fiber 10, a secondary resin layer 24 (secondary coating resin layer) covering the outer periphery of the primary resin layer 22, and a colored resin layer 26 covering the outer periphery of the secondary resin layer 24. The glass fiber 10, the primary resin layer 22, the secondary resin layer 24 and the colored resin layer 26 are concentrically arranged.

The primary resin layer 22 is in contact with an outer peripheral surface of the cladding 14, and covers the whole cladding 14. A Young's modulus of the primary resin layer 22 is, for example, 0.7 MPa or smaller. The outer diameter of the primary resin layer 22 is, for example, 120 μm or larger and 140 μm or smaller.

The secondary resin layer 24 is in contact with the outer peripheral surface of the primary resin layer 22, and covers the whole primary resin layer 22. The Young's modulus of the secondary resin layer 24 is, for example, 800 MPa or larger and 3000 MPa or smaller. The outer diameter of the secondary resin layer 24 is, for example, 150 μm or larger and 170 μm or smaller.

The primary resin layer 22 and the secondary resin layer 24 include a cured material of an ultraviolet curing resin composition. That is, the coating resin 20 includes the cured material of the ultraviolet curing resin composition. The ultraviolet curing resin composition used in the primary resin layer 22 and the secondary resin layer 24 is urethane acrylate for example. By applying the rein composition to the glass fiber 10, then radiating ultraviolet rays and causing the resin composition to be cured, the primary resin layer 22 and the secondary resin layer 24 are formed.

The colored resin layer 26 is in contact with the outer peripheral surface of the secondary resin layer 24, and covers the whole secondary resin layer 24. The colored resin layer 26 configures an outermost layer of the coating resin 20. The outer diameter of the coating resin 20 is 160 μm or larger and 170 μm or smaller for example. The colored resin layer 26 includes the cured material of the resin composition including coloring ink.

In the optical fiber 1 of the present embodiment, for example, the outer diameter of the glass fiber 10 is 100 μm, the outer diameter of the primary resin layer 22 is 135 μm, the outer diameter of the secondary resin layer 24 is 155 μm, and the outer diameter of the colored resin layer 26 is 165 μm.

One example of a manufacturing method of the optical fiber 1 will be described. First, an optical fiber base material is prepared, and a glass fiber is formed by drawing the optical fiber base material. The step includes a step of gradually cooling the glass fiber drawn in a drawing furnace in a heating furnace at a temperature lower than the drawing furnace, and a step (deuterium ($D_2$) processing) of exposing the gradually cooled glass fiber to a deuterium gas atmosphere. Note that the step of the deuterium processing may not be executed in a series of drawing step and may be executed in a different step after drawing is ended.

First, the optical fiber base material is put into the drawing furnace, heated and melted, and the glass fiber turned to a small diameter is pulled out from the drawing furnace. Thereafter, gradual cooling is performed in the heating furnace at the temperature lower than the drawing furnace, and when glass is cured to a certain extent, forcible cooling is performed to be close to a room temperature.

When a cooling speed after drawing is accelerated by diameter reduction of the glass fiber, non-bridging oxygen hole centers (NBOHC) increase in the glass fiber. The NBOHC is bonded with hydrogen and Si—OH is generated. When a hydroxyl group (—OH) is generated, transmission loss of the optical fiber 1 increases. By the $D_2$ processing, the NBOHC reacts with deuterium, and a deuterioxyl group (—OD) is generated. Since an absorption peak of the deuterioxyl group is different from the absorption peak of the hydroxyl group, increase of the transmission loss due to the diameter reduction of the glass fiber can be suppressed. The cladding of the $D_2$-processed optical fiber has the absorption peak at a wave number of 2500 $cm^{-1}$ or larger and 3000 $cm^{-1}$ or smaller as the absorption peak due to Si-OD, in an IR spectrum (infrared absorption spectrum in infrared spectroscopy). Note that the IR spectrum can be measured by a general measuring apparatus such as ThermoScientific Nicolet 8700 made by ThermoFisher Scientific.

Next, a layer to be the primary resin layer 22 is formed by applying the ultraviolet curing resin composition on a surface of the formed glass fiber, and a layer to be the secondary resin layer 24 is formed by applying the ultraviolet curing resin composition on the surface of the layer. Then, the layers are cured by ultraviolet irradiation, and the primary resin layer 22 and the secondary resin layer 24 are formed. Note that an applying method is not limited to the above description, and the primary resin layer may be applied, then irradiated with ultraviolet rays and cured and the secondary resin layer may be applied and cured thereafter. In this method, first, the layer to be the primary resin layer 22 is formed by applying the ultraviolet curing resin composition and is cured by the ultraviolet irradiation to form the primary resin layer 22. Then, the layer to be the secondary resin layer 24 is formed by applying the ultraviolet curing resin composition on the surface of the primary resin layer 22 and is cured by the ultraviolet irradiation to form the secondary resin layer 24.

Next, the colored resin layer 26 is formed on the surface of the secondary resin layer 24, and the optical fiber is obtained. Note that the colored resin layer may be formed in a step different from the drawing step.

Subsequently, a screening test is executed to the obtained optical fiber. In the screening test, the optical fiber is pulled by 0.69 GPa in the center axis direction, and tensile strain of 1% is generated. For example, when there is a scratch on the surface of the glass fiber, the optical fiber is disconnected at the part. The part which is not disconnected by the screening test, that is, the part where the tensile strength in the center axis direction is larger than 0.69 GPa, is defined as the optical fiber 1.

In the optical fiber 1 obtained as above, the outer diameter of the glass fiber 10 is 99 μm or larger and 101 μm or smaller. Therefore, even when the outer diameter of the coating resin 20 is 160 μm or larger and 170 μm or smaller and the diameter is reduced, a thickness of the coating resin 20 is secured. Thus, even in a case where irregular stress is applied to the coating resin 20 as a lateral pressure, irregular bending of the glass fiber 10 is suppressed. In addition, in the optical fiber 1, a mode field diameter for light having a wavelength of 1310 nm is 7.2 μm or larger and 8.2 μm or smaller and is narrowed around 7.7 μm. Thus, microbending loss is suppressed. Therefore, the transmission loss can be suppressed while reducing the diameter. Note that the mode field diameter is according to a definition of Petermann-I.

As described above, the primary resin layer 22 and the secondary resin layer 24 are formed by applying the resin composition on the surface of the drawn glass fiber 10 and curing the resin composition. When the thickness of the primary resin layer 22 and the secondary resin layer 24 is thin, there is a case where the resin composition cannot follow the glass fiber when the glass fiber is drawn at a high linear velocity and so-called application shortage occurs. In the optical fiber 1, since the thickness of the coating resin 20 is secured, the application shortage is suppressed. Thus, the optical fiber 1 can be stably manufactured.

In the screening test described above, the optical fiber is strongly clamped by a roller and a capstan belt. At the time, when a solid foreign matter is stuck to the surface of the optical fiber, there is a risk that the foreign matter breaks through a resin coating film and the surface of the glass fiber is scratched, causing disconnection. The optical fiber 1 is normally shipped by a fixed length (specified length). When a disconnection frequency increases, the optical fiber 1 of a fractional length which is shorter than the specified length and cannot be shipped increases. Thus, a yield declines and a manufacturing cost increases. In the optical fiber 1, since the thickness of the coating resin 20 is secured, generation of a scratch on the surface of the glass fiber by the foreign matter is suppressed. As a result, since the disconnection is suppressed and the yield of the optical fiber 1 improves, the manufacturing cost can be suppressed.

When the optical fiber 1 is wound around a mandrel having a radius of 10 mm, that is, when the optical fiber 1 is wound in a ring shape having the radius of 10 mm, bending loss at the wavelength of 1550 nm is 0.1 dB/turn or less. In addition, when the optical fiber 1 is wound around the mandrel having the radius of 7.5 mm, that is, when the optical fiber 1 is wound in the ring shape having the radius of 7.5 mm, the bending loss at the wavelength of 1550 nm is 0.5 dB/turn or less.

A cable cutoff wavelength of the optical fiber 1 is 1530 nm or shorter. The transmission loss of the optical fiber 1 at the wavelength of 1530 nm or longer and 1565 nm or shorter is 0.3 dB/km or less. A loss increase amount (sandpaper lateral pressure loss increase) at the wavelength of 1550 nm when the outer periphery of a bobbin (cylinder) having the outer diameter of 280 mm is covered with sandpaper of #240 and the optical fiber 1 is wound around the outer periphery of the bobbin with tension of 0.8 N in such a way as to be in contact with the sandpaper is 1 dB/km or less. Thus, by the optical fiber 1, the light having the wavelength of 1550 nm can be transmitted with low loss. Since the wavelength 1550 nm is generally and widely used, it is not needed to exchange an existing transmitter-receiver, and a communication network can be constructed at a low cost.

Or, the cable cutoff wavelength of the optical fiber 1 is 1260 nm or shorter. The transmission loss of the optical fiber 1 at the wavelength of 1310 nm or longer and 1625 nm or shorter is 0.4 dB/km or less. The loss increase amount at the wavelength of 1310 nm when the outer periphery of the bobbin (cylinder) having the outer diameter of 280 mm is covered with the sandpaper of #240 and the optical fiber 1 is wound around the outer periphery of the bobbin with tension of 0.8 N in such a way as to be in contact with the sandpaper is 1 dB/km or less. Thus, by the optical fiber 1, the light having the wavelength of 1310 nm can be transmitted with low loss. Since the wavelength 1310 nm is generally and widely used, it is not needed to exchange an existing transmitter-receiver, and a communication network can be constructed at a low cost.

In the optical fiber 1, a MAC value (=MFD/$\lambda$cc×1000) being a ratio of a mode field diameter MFD [μm] for the light having the wavelength of 1310 nm to a cable cutoff wavelength $\lambda$cc [nm] is 6.9 or smaller. The MAC value is correlated with the microbending loss, and the microbending loss is suppressed when the MAC value is smaller. Thus, by the optical fiber 1, the microbending loss can be more surely suppressed. An upper limit value of the mode field diameter MFD for the light having the wavelength of 1310 nm is 8.1 μm for example. A lower limit value of the cable cutoff wavelength $\lambda$cc is 1180 nm for example.

Since the cooling speed after the drawing is accelerated by the diameter reduction of the glass fiber 10, the drawing at the high linear velocity becomes possible, and productivity improves. When the cooling speed after the drawing is accelerated, the virtual temperature becomes high. The virtual temperature is correlated with the transmission loss, and the transmission loss is suppressed when the virtual temperature is lower. In the optical fiber 1, the virtual temperature of the glass configuring the glass fiber 10 is 1600° C. or higher and 1700° C. or lower. In this way, in the optical fiber 1, since the increase of the virtual temperature is suppressed, the increase of the transmission loss is suppressed.

It is known that the virtual temperature can be measured by Raman spectroscopy. In this method, a laser beam at the wavelength of 532 nm is converged to a fiber end face and a frequency spectrum of generated Raman scattering light is measured. From the measured spectrum, an area ratio (D2/ω3) of a wide ω3 peak (800 cm$^{-1}$) due to Si—O—Si deformation vibrations intrinsic to quartz glass and a D2 peak (605 cm$^{-1}$) due to stretching vibrations of a three-membered ring is calculated. It is known that there is a linear correlation between the calculated D2/ω3 and the virtual temperature of the glass. Thus, the virtual temperature of the fiber can be obtained from the correlation.

In the optical fiber 1, since the germanium is added to the core 12, the specific refractive index difference between the core 12 and the cladding 14 can be turned to the predetermined value or larger. In this way, since the core 12 includes the material in which the germanium is added to the pure silica glass and the cladding 14 includes the pure silica glass, the optical fiber 1 can be manufactured by same manufacturing facility and manufacturing process as a conventional general purpose single mode optical fiber. Thus, an initial cost can be suppressed.

In the optical fiber 1, in the IR spectrum, the cladding 14 has the absorption peak at the wave number of 2500 cm$^{-1}$ or larger and 3000 cm$^{-1}$ or smaller as the absorption peak due to the deuterium processing. Thus, the defects (NBOHC) increased accompanying the diameter reduction of the glass fiber 10 are repaired by the deuterium processing. Thus, the transmission loss can be suppressed further.

Since the optical fiber 1 is manufactured through the screening test of pulling by 0.69 GPa in the center axis direction, the tensile strength in the center axis direction of the optical fiber 1 is larger than 0.69 GPa. Thus, the disconnection of the optical fiber 1 can be suppressed.

The coating resin 20 includes the primary resin layer 22 and the secondary resin layer 24. Therefore, for example, by configuring the primary resin layer 22 by the material of the low Young's modulus and configuring the secondary resin layer 24 by the material of the high Young's modulus or the like, a microbending loss resistant characteristic can be efficiently improved.

The Young's modulus of the primary resin layer 22 is 0.7 MPa or smaller. The outer diameter of the primary resin layer 22 is 120 μm or larger and 140 μm or smaller. The Young's modulus of the secondary resin layer 24 is 800 MPa or larger and 3000 MPa or smaller. The outer diameter of the secondary resin layer 24 is 150 μm or larger and 170 μm or smaller. Thus, the microbending loss resistant characteristic can be efficiently improved.

Since the coating resin 20 includes the colored resin layer 26, identification of the optical fiber 1 is facilitated by the colored resin layer 26. Note that, when the colored resin layer 26 is formed in the drawing step, the step of forming the colored resin layer 26 can be omitted so that the productivity improves.

The present invention is not limited to the embodiment described above and can be variously modified.

Figure 2:
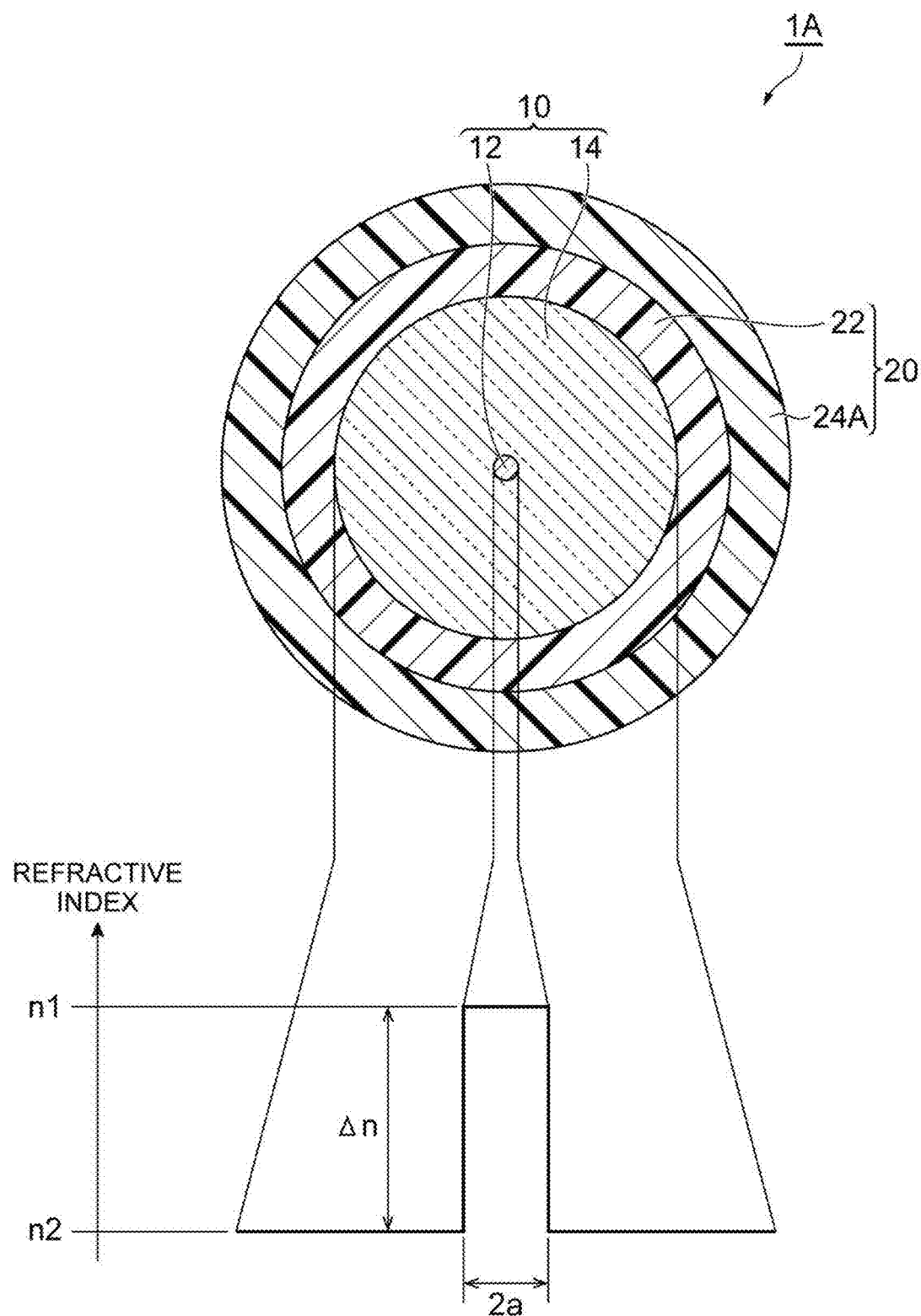
FIG. 2 illustrates a sectional view and a refractive index distribution of an optical fiber according to a modification.

FIG. 2 is a sectional view of the optical fiber according to a modification and a diagram illustrating a refractive index distribution. As illustrated in FIG. 2, an optical fiber 1A according to the modification is different from the optical fiber 1 according to the embodiment at a point of not including the colored resin layer 26 and including a secondary resin layer 24A instead of the secondary resin layer 24. The secondary resin layer 24A is different from the secondary resin layer 24 at the point of including coloring ink and configuring the outermost layer of the coating resin 20. In the optical fiber 1A, for example, the outer diameter of the glass fiber 10 is 100 pun, the outer diameter of the primary resin layer 22 is 135 μm, and the outer diameter of the secondary resin layer 24A is 165 μm.

EXAMPLES

The present invention will be more specifically described with examples hereinafter, however, the present invention is not limited by the examples described below.

Elements and characteristics of the optical fiber according to examples 1 to 4 and a comparative example are indicated in Table 1.

TABLE 1

|  | Example 1 | Example 2 | Example 3 | Example 4 | Comparative example |
|---|---|---|---|---|---|
| Core composition | Germanium-added quartz | | | | |
| Cladding composition | Pure quartz | | | | |
| Transmission wavelength [nm] | 1550 | 1550 | 1310 | 1310 | 1550 |
| Core diameter (2a) [μm] | 8.0 | 8.0 | 7.0 | 7.0 | 8.0 |
| Cladding diameter [μm] | 100 | 100 | 100 | 100 | 125 |
| Specific refractive index difference (Δn) [%] | 0.55 | 0.55 | 0.48 | 0.48 | 0.55 |
| Primary resin layer Young's modulus [MPa] | 0.7 | 0.7 | 0.7 | 0.7 | 0.7 |
| Secondary resin layer Young's modulus [MPa] | 1000 | 1000 | 1000 | 1000 | 1000 |
| Primary resin layer outer diameter [μm] | 135 | 135 | 135 | 135 | 140 |
| Secondary resin layer outer diameter [μm] | 155 | 165 | 155 | 165 | 165 |
| Colored resin layer outer diameter [μm] | 165 | None | 165 | None | None |
| MFD (1310 nm) [μm] | 7.7 | 7.7 | 7.6 | 7.6 | 7.7 |
| Cable cutoff wavelength [nm] | 1462 | 1462 | 1203 | 1203 | 1462 |
| MAC value | 5.27 | 5.27 | 6.32 | 6.32 | 5.27 |
| Bending loss (R 10 mm/1550 nm) [dB/turn] | Less than 0.01 | Less than 0.01 | Less than 0.01 | Less than 0.01 | Less than 0.01 |
| Bending loss (R 7.5 mm/1550 nm) [dB/turn] | Less than 0.01 | Less than 0.01 | Less than 0.01 | Less than 0.01 | Less than 0.01 |
| Sandpaper lateral pressure loss increase (1310 nm) [dB/km] | 0.5 | 0.5 | 0.7 | 0.7 | 2.5 |
| Sandpaper lateral pressure loss increase (1550 nm) [dB/km] | 0.8 | 0.8 | 0.9 | 0.9 | 5.8 |
| Transmission loss (1310 nm) [dB/km] | 0.33 | 0.33 | 0.35 | 0.35 | 0.33 |
| Transmission loss (1550 nm) [dB/km] | 0.21 | 0.21 | 0.22 | 0.22 | 0.20 |
| 0.69 GPa Screening disconnection frequency [times/km] | Less than 0.01 | Less than 0.01 | Less than 0.01 | Less than 0.01 | 12 |

The optical fibers according to the examples 1 and 3 have a form corresponding to the optical fiber 1 according to the embodiment described above. The optical fibers according to the examples 2 and 4 have a form corresponding to the optical fiber 1A according to the modification described above. The optical fiber according to the comparative example has a form that the colored resin layer is not included and the secondary resin layer includes the coloring ink and configures the outermost layer of the coating resin, similarly to the optical fiber 1A according to the modification described above.

As indicated in Table 1, in the optical fiber according to the comparative example, the outer diameter (cladding diameter) of the glass fiber is 125 μm and the outer diameter (secondary resin layer outer diameter) of the coating resin is 165 μm. Thus, the thickness of the coating resin in the optical fiber according to the comparative example is roughly 20 μm. In contrast, in the optical fibers according to the examples 1 to 4, the outer diameter (cladding diameter) of the glass fiber is 100 μm and the outer diameter (colored resin layer outer diameter or secondary resin layer outer diameter) of the coating resin is 165 μm. Thus, the thickness of the coating resin in the optical fibers according to the examples 1 to 4 is roughly 32.5 μm and is thicker than the thickness of the coating resin in the optical fiber according to the comparative example.

In the optical fiber according to the comparative example, the sandpaper lateral pressure loss increase at the wavelength of 1310 nm (the loss increase amount at the wavelength of 1310 nm when the outer periphery of the bobbin having the outer diameter of 280 mm is covered with the sandpaper of #240 and the optical fiber 1 is wound around the outer periphery of the bobbin with the tension of 0.8 N in such a way as to be in contact with the sandpaper) was 2.5 dB/km, and the loss increase amount at the wavelength of 1550 nm was 5.8 dB/km. In contrast, in the optical fibers according to the examples 1 to 4, the sandpaper lateral pressure increases at the wavelength of 1310 nm and the wavelength of 1550 nm were both 1 dB/km or less.

In the optical fiber according to the comparative example, the disconnection frequency of the optical fiber in the screening test of pulling the optical fiber by 0.69 GPa in the center axis direction and generating the tensile strain of 1% was 12 times/km. In contrast, in the optical fibers according to the examples 1 to 4, the disconnection frequencies of the optical fibers in the screening test were all less than 0.01 times/km.

In this way, compared to the optical fiber according to the comparative example, in the optical fibers according to the examples 1 to 4, since the thickness of the coating resin is secured, the sandpaper lateral pressure loss increase and the disconnection frequency in the screening test were suppressed.

What is claimed is:

1. An optical fiber comprising a glass fiber and a coating resin covering an outer periphery of the glass fiber,
    wherein the glass fiber includes a core and a cladding covering an outer periphery of the core,
    a refractive index of the cladding is lower than a refractive index of the core,
    an outer diameter of the glass fiber is 99 μm or larger and 101 μm or smaller,
    the coating resin includes a cured material of an ultraviolet curing resin composition,
    an outer diameter of the coating resin is 160 μm or larger and 170 μm or smaller,
    a mode field diameter for light having a wavelength of 1310 nm is 7.2 μm or larger and 8.2 μm or smaller,
    bending loss at a wavelength of 1550 nm when wound in a ring shape having a radius of 10 mm is 0.1 dB/turn or less, and
    bending loss at the wavelength of 1550 nm when wound in the ring shape having the radius of 7.5 mm is 0.5 dB/turn or less.

2. The optical fiber according to claim 1,
    wherein a cable cutoff wavelength is 1530 nm or shorter,
    transmission loss at the wavelength of 1530 nm or longer and 1565 nm or shorter is 0.3 dB/km or less, and a loss increase amount at the wavelength of 1550 nm when an outer periphery of a cylinder having the outer diameter of 280 mm is covered with sandpaper of #240 and the optical fiber is wound around the outer periphery of the cylinder with tension of 0.8 N in such a way as to be in contact with the sandpaper is 1 dB/km or less.

3. The optical fiber according to claim 1,
wherein a cable cutoff wavelength is 1260 nm or shorter, transmission loss at the wavelength of 1310 nm or longer and 1625 nm or shorter is 0.4 dB/km or less, and
a loss increase amount at the wavelength of 1550 nm when an outer periphery of a cylinder having the outer diameter of 280 mm is covered with sandpaper of #240 and the optical fiber is wound around the outer periphery of the cylinder with tension of 0.8 N in such a way as to be in contact with the sandpaper is 1 dB/km or less.

4. The optical fiber according to claim 1, wherein a MAC value being a ratio of a mode field diameter MFD [μm] for the light having the wavelength of 1310 nm to a cable cutoff wavelength λcc [nm] is 6.9 or smaller.

5. The optical fiber according to claim 1, wherein a virtual temperature of glass configuring the glass fiber is 1600° C. or higher and 1700° C. or lower.

6. The optical fiber according to claim 1, wherein the core includes a material in which germanium is added to pure silica glass, and the cladding includes the pure silica glass, and has an absorption peak at a wave number of 2500 $cm^{-1}$ or larger and 3000 $cm^{-1}$ or smaller in an IR spectrum.

7. The optical fiber according to claim 1, wherein tensile strength in a center axis direction is larger than 0.69 GPa.

8. The optical fiber according to claim 1, wherein the coating resin includes a primary coating resin layer covering the outer periphery of the glass fiber and a secondary coating resin layer covering an outer periphery of the primary coating resin layer.

9. The optical fiber according to claim 8,
wherein a Young's modulus of the primary coating resin layer is 0.7 MPa or smaller,
an outer diameter of the primary coating resin layer is 120 μm or larger and 140 μm or smaller,
a Young's modulus of the secondary coating resin layer is 800 MPa or larger and 3000 MPa or smaller, and
an outer diameter of the secondary coating resin layer is 150 μm or larger and 170 μm or smaller.

10. The optical fiber according to claim 9,
wherein the coating resin further includes a colored resin layer covering an outer periphery of the secondary coating resin layer, and
an outer diameter of the colored resin layer is 160 μm or larger and 170 μm or smaller.

11. The optical fiber according to claim 8, wherein the secondary coating resin layer includes coloring ink, and configures an outermost layer of the coating resin.

* * * * *